United States Patent [19]

Challenger

[11] 4,034,693
[45] July 12, 1977

[54] DEVICE FOR AUTOMATIC RAISING OF FISH TRAPS, CRAYFISH POTS, NETS AND THE LIKE

[76] Inventor: Clarence William Challenger, 16 Shadbolt St., Booragoon, Australia

[21] Appl. No.: 588,957

[22] Filed: June 20, 1975

[30] Foreign Application Priority Data

Sept. 27, 1974 Australia ............................ 9059/74

[51] Int. Cl.² .......................................... B63G 8/22
[52] U.S. Cl. .................... 114/16 E; 9/8 R; 43/100; 43/102
[58] Field of Search ................ 9/8 R, 10; 114/16 E, 114/16.8, 50, 52, 68, 123; 73/170 A; 43/100, 102, 103

[56] References Cited

U.S. PATENT DOCUMENTS

| 1,375,055 | 4/1921 | Lodato | 114/68 |
| 2,453,149 | 11/1948 | McCutchen | 114/68 |
| 3,126,559 | 3/1964 | Alexander | 9/10 |
| 3,193,853 | 7/1965 | Alexander | 9/8 R |
| 3,293,676 | 12/1966 | Link | 9/8 R |
| 3,818,523 | 6/1974 | Stillman | 9/8 R |
| 3,822,662 | 7/1974 | Morita et al. | 114/123 |
| 3,852,908 | 12/1974 | Christopher | 43/102 |
| 3,860,983 | 1/1975 | Furth et al. | 9/8 R |

Primary Examiner—Trygve M. Blix
Assistant Examiner—Charles E. Frankfort

[57] ABSTRACT

A device for automatically raising fish traps, crayfish pots, nets and the like comprising a cylinder of compressed gas connected through a control valve to a buoyancy chamber provided with a discharge opening and adapted to be filled with water when the trap is submerged, the operation of the control valve is to allow gas to pass from the cylinder to the buoyancy chamber and expel water from the buoyancy chamber being effected through a timing mechanism or an electrical circuit activated by a signal transmitted through the water.

8 Claims, 8 Drawing Figures

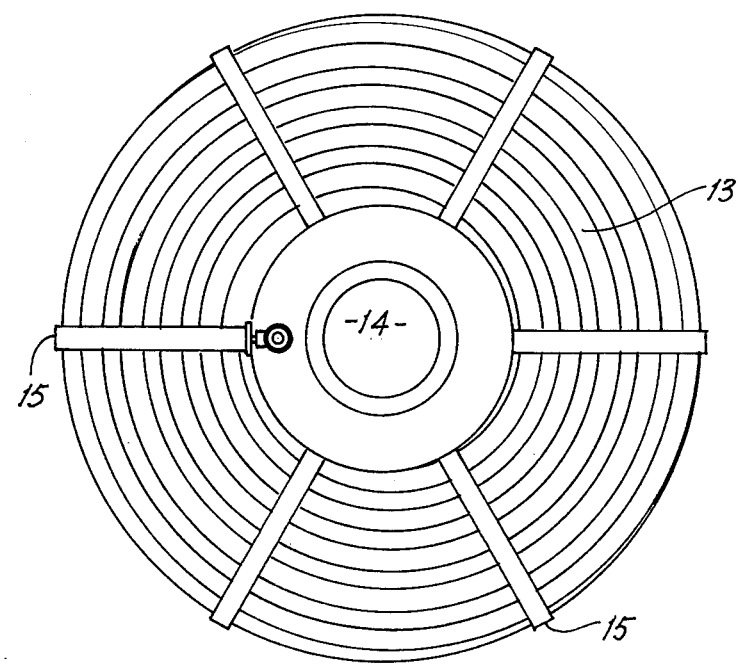
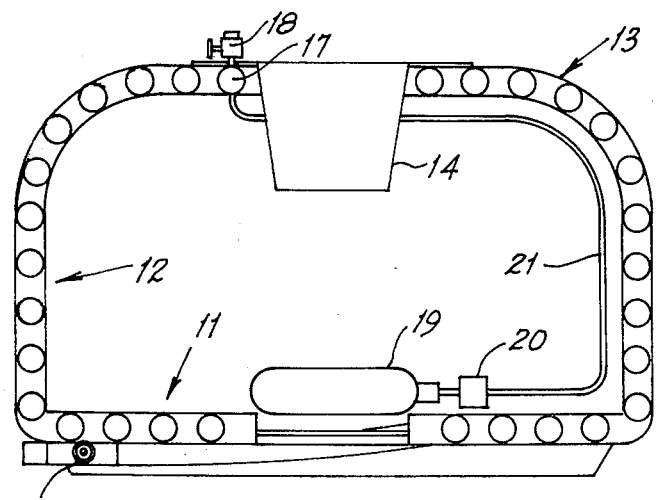

DEVICE FOR AUTOMATIC RAISING OF FISH TRAPS, CRAYFISH POTS, NETS AND THE LIKE

BACKGROUND OF THE INVENTION

This invention relates to a device for automatically raising fish traps, crayfish pots, nets and the like, hereinafter collectively referred to as "trap" without the aid of ropes and the like.

Hitherto fishermen and particularly cray or rock lobster fishermen have been more or less compelled to operate in relatively shallow water generally not in excess of two hundred feet in depth. One disadvantage when fishing in deeper waters is the additional cost of longer and heavier hauling lines and the amount of labor and the time required to bring the trap to the surface. A further disadvantage which also applies to traps laid in shallow water is that the floats attached to the line tend to lift the trap off the bottom when a heavy swell is running so that the trap walks along the bottom.

The object of the present invention is to provide a device for automatically raising traps which eliminates the need for long lengths of hauling line and reduces the amount of time and labor required to raise the trap and remove the catch therefrom.

SUMMARY OF THE INVENTION

In one form the invention resides in a device for automatically raising traps comprising a cylinder of compressed gas connected through a control valve to a buoyancy chamber being provided with a discharge opening. The operation of the control valve allows gas to pass from the cylinder to the buoyancy chamber and expel water from the buoyancy chamber. This is effected through a timing mechanism or an electrical circuit activated by a signal transmitted through the water.

The buoyancy chamber may comprise a deflated balloon fitted inside a holder or it may comprise a second cylinder which is attached to the trap or it may be one or more compartments formed in one or more members from which the trap is formed. In particular the walls of the trap may be formed of a length of plastic pressure pipe wound in a spiral form with one end connected to the gas cylinder and the other end open.

Whilst the timing mechanism may be used to effect operation of the control valve after a predetermined time this requires that the fisherman be adjacent the location of the trap at the predetermined time so that he can recover the trap and remove the catch. It is therefore preferable to use a radio or sound signal to activate an electrical circuit to operate the valve. Because of the fact that radio waves do not penetrate water to any extent unless they are of very low frequency a sound signal is to be preferred, and in order to avoid the device being triggered accidentally it is preferable to use a coded signal.

BRIEF DESCRIPTION OF THE DRAWINGS

The invention will be better understood by reference to the following description of the specific embodiments shown in the accompanying drawings wherein:

FIG. 1 is a plan view of a crayfish pot constructed in accordance with the invention;

FIG. 2 is a sectional view of the pot of FIG. 1;

DESCRIPTION OF THE PREFERRED EMBODIMENTS

Figure 3:
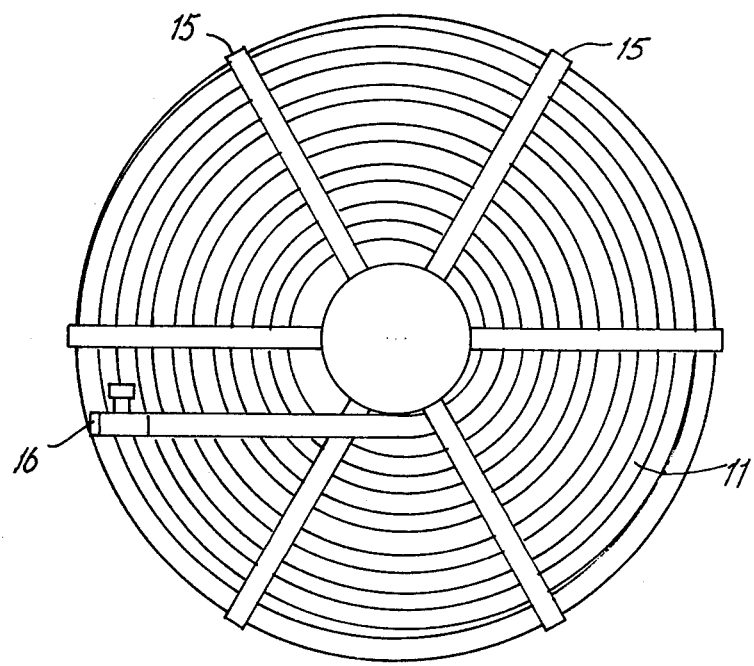
FIG. 3 is an inverted plan view of the pot of FIG. 1.

Referring now to the embodiment shown in FIGS. 1, 2 and 3 of the drawings the crayfish pot is formed by winding a length of plastic pressure pipe into a spiral form to form a substantially flat bottom 11 and a substantially cylindrical wall 12, the turns decreasing in diameter to form a rounded top 13 which is fitted with a conventional frusto conical mouth 14 formed of solid plastic or other suitable material. The turns of the pipe are held in position by a series of ribs 15 formed of metal or other suitable material. One end 16 of the pipe is situated at the bottom of the trap and is open. The other end 17 is adjacent the mouth 14 and is fitted with a tap, or valve 18. A cylinder 19 of carbon dioxide is fitted into the bottom of the pot and is connected through a control unit 20 and a length of pipe 21 to the end 17 of the pressure pipe.

The control unit 20 may comprise a timing mechanism coupled to a valve so that after a predetermined time the valve opens to allow gas to flow from the cylinder into the pressure pipe. Preferably the control unit 20 is constructed as shown in the block circuit diagram of FIGS. 7 and 8 and comprises a signal detector and decoder coupled to a solenoid driver which actuates a solenoid valve as hereinafter described. When the solenoid valve is opened gas flows from the cylinder 19 through the pipe 21 to the end 17 of the plastic pressure pipe.

In operation, the pot after having been fitted with a cylinder 19 filled with $CO_2$ under pressure, is baited and then the plastic extrusion pipe filled with water by inserting a hose into the end 16 and opening the tap 18. When filled the tap 18 is closed the hose removed and the pot dropped into the water. The pot sinks to the bottom and when the fisherman returns to the location he transmits a coded sound signal by placing a signal generator into the water. The control unit 20 picks up the signal and opens the solenoid valve. The gas passing from the cylinder 19 expels the water from the plastic extrusion pipe through the end 16. The pot becomes buoyant and rises to the surface. As it rises to the surface excess gas is discharged through the open end 16 of the extrusion pipe. The pot is recovered and the catch removed. The cylinder 19 is recharged or replaced with a fresh cylinder, rebaited, the plastic pipe filled with water and then returned to the water.

Figure 4:
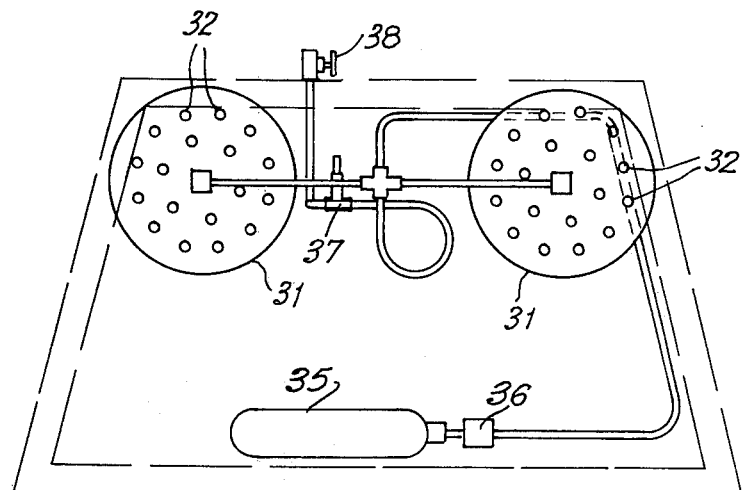
FIG. 4 is an end view of a second embodiment.
Figure 5:
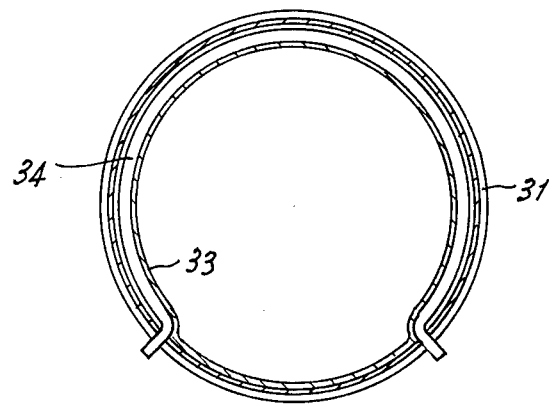
FIG. 5 is a cross section of the buoyancy chambers of the embodiment of FIG. 4.
Figure 6:
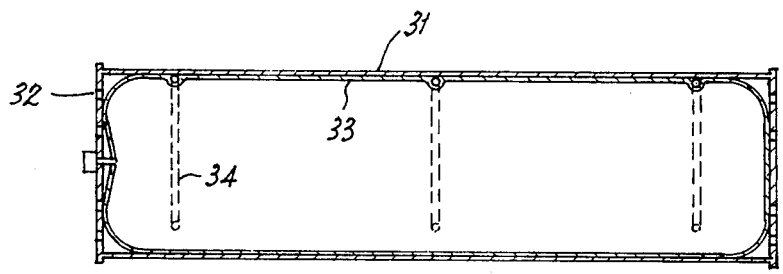
FIG. 6 is a longitudinal section of the buoyancy chambers of the embodiment of FIG. 4.

The trap shown in FIGS. 4, 5 and 6 of the drawings is a conventional slotted type of pot and is fitted with two cylindrical buoyancy chambers 31, each being formed of metal and the ends having a series of holes 32 formed therein. Each chamber 31 is fitted with a heavy duty rubber bladder 33 held in place by a series of lengths of rubber 34 the ends of which are anchored in holes in the walls of the chamber. The ends of the bladders are connected to a gas cylinder 35 through a control unit 36 similar to that of control unit 20 of the above described first embodiment. The gas line is fitted with a pressure relief valve 37 and a manual valve 38.

The operation of this trap is similar to that of the first embodiment. The manual valve 38 is opened to allow the gas in the bladders 33 to escape to atmosphere being forced out of the bladders by the action of the rubbers 34. When the bladders 33 have completely collapsed the valve 38 is closed, the cylinder 35 recharged or replaced with a fresh cylinder and the pot baited. When placed in the water the chambers 31 fill with water through the holes 32. When control unit 36 is activated the gas fills the bladders to expel the water from the chamber 31. This renders the pot buoyant and it rises to the surface. As it rises to the surface the pressure relief valve 37 vents excess gas to prevent the bladders 33 from bursting.

Figure 7:
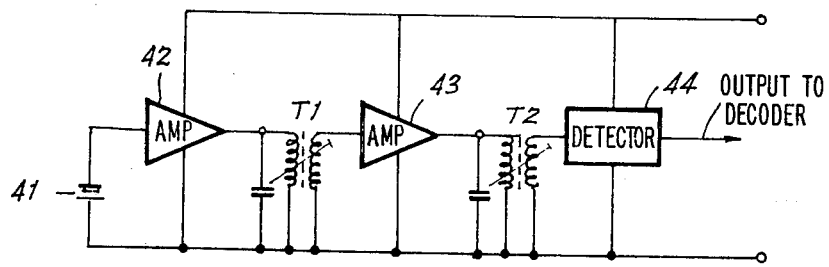
FIG. 7 is a block circuit diagram of a preferred form of signal receiver.
Figure 8:
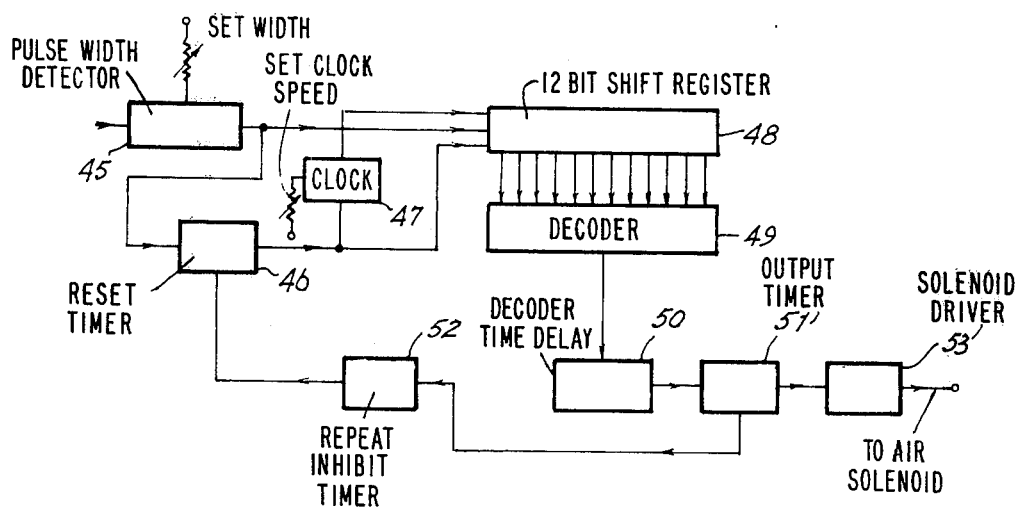
FIG. 8 is a block circuit diagram of a preferred form of signal decoder and solenoid driver.

The signal receiver shown in FIG. 7 of the drawing comprises a microphone or similar sound detector 41 which is connected through amplifiers 42 and 43 to a detector 44 which generates a signal which is fed to a pulse width detector 45 of the decoder and solenoid driver shown in FIG. 8. The components of the signal passing through the detector 44 are fed through a reset times 46 and clock 47 to a 12 bit shift register 48 which feeds a decoder 49. The decoder output passes through a decoder time delay 50 and an output timer 51, to the solenoid driver 53 which activates a solenoid valve (not shown). The output timer 51 is also connected to the reset timer 46 through a repeat inhibit timer 52. The design of the decoder is such that the solenoid driver cannot be actuated by a signal other than that put out by the signal generator. Even if a signal of the same combination as that generated by the signal generator is picked up by the detector the analysis of the pulse width and the timing of the various components of the signal will ensure that except through a most extraordinary coincidence the control unit will not be activated by a stray signal. The code is set by changing the decoder matrix.

The components of the signal receiver, decoder solenoid driver and the solenoid valve are preferably embedded in a block of resin such as an epoxy resin so that they will be rendered waterproof at a depth greater than that at which they will normally operate. Preferably the battery providing the electric power for the control unit is encased in the plastic.

Whilst the invention has been described with particular reference to two specific embodiments it is not limited thereto. The invention could be applied to fishing nets by fitting a plastic extrusion pipe to the periphery of the net and connecting the pipe to a gas cylinder through a control unit as in the two above described embodiments.

In order that the area in which the traps have been laid may be easily located, a float may be attached to one of the traps and balloon filled with a light weight gas such as helium or hydrogen attached to the float. A radio transmitter or a light may be attached to the balloon so that the vessel will be able to pick up the balloon without any undue difficulty. Alternatively the balloon may be provided with a metallic reflecting surface so that it can be readily located by radar equipment carried by the fishing vessel.

Alternatively the trap itself may be fitted with a small radio transmitter adapted to be actuated when the trap floats to the surface to enable the position of the trap to be readily ascertained by the fishing vessel.

I claim:

1. A trap for fish, crayfish and the like comprising a body formed from a length of plastic pressure pipe wound into a spiral to define a bottom, wall and top of the body, a gass cylinder and a control unit, one end of the pipe being open and the other end being connected to said gas cylinder through said control unit, a valve connected to said other end of said pipe, said pipe being filled through said valve with water to render said body non-buoyant, said control unit having a control valve actuated by a signal transmitted through the water in which the trap is located, the actuation of said control valve by said signal expelling water from said pipe by gas from said gas cylinder to render said body buoyant.

2. A device as claimed in claim 1 wherein said signal is a radio signal.

3. A device as claimed in claim 1 wherein said signal is a sound signal.

4. A trap as claimed in claim 1 wherein said control valve is a solenoid valve actuated by said control unit comprising a signal receiver, a signal decoder and a solenoid driver.

5. A device for automatically raising fish traps, crayfish pots, nets and the like comprising: a buoyancy chamber on said trap; a control valve; a cylinder of compressed gas connected through said control valve to said buoyancy chamber, said buoyancy chamber having a discharge opening and being filled with water when the trap is submerged, the operation of said control valve allowing gas to pass from said cylinder to said buoyancy chamber for expelling water from said buoyancy chamber; and signal receiving means actuated by a signal transmitted through the water for operation of said control valve, said buoyancy chamber comprising a second cylinder positioned inside the trap, said trap being formed from a length of plastic pressure pipe wound into a spiral to define a bottom, sides and top of the trap, one end of the pipe being open and the other end having a tap, said gas cylinder being connected to the other end of the pipe through said control valve.

6. A device as claimed in claim 5, said second cylinder including a holder and a bladder means fitted inside said holder.

7. A device as claimed in claim 6 wherein said holder comprises a metal cylinder having ends provided with openings through which water may pass into or out of the metal cylinder, said bladder means being held in place by one or more lengths of extendable rubber for expelling gas from said bladder means when it is vented to atmosphere.

8. A device as claimed in claim 6 including a pressure relief valve, said bladder means being connected to said pressure relief valve to allow excess gas to escape as the trap rises to the surface.

* * * * *